United States Patent

Shoki et al.

[11] Patent Number: 6,087,986
[45] Date of Patent: Jul. 11, 2000

[54] ADAPTIVE ARRAY ANTENNA USED IN MULTI-CARRIER WAVE RADIO COMMUNICATIONS

[75] Inventors: Hiroki Shoki; Minoru Namekata; Manabu Mukai, all of Kawasaki, Japan

[73] Assignee: Kabushiki Kaisha Toshiba, Kawasaki, Japan

[21] Appl. No.: 08/933,275

[22] Filed: Sep. 18, 1997

[30] Foreign Application Priority Data

Sep. 18, 1996 [JP] Japan ................................. 8-246366

[51] Int. Cl.[7] ...................................................... G01S 3/28
[52] U.S. Cl. ........................................................ 342/383
[58] Field of Search ................................. 342/380, 383, 342/378; 455/272, 273, 275, 276.1

[56] References Cited

U.S. PATENT DOCUMENTS

| | | | |
|---|---|---|---|
| 4,890,302 | 12/1989 | Muilwijk | 375/80 |
| 5,274,844 | 12/1993 | Harrison et al. | 342/378 |
| 5,473,333 | 12/1995 | Chiba | 342/378 |
| 5,854,612 | 12/1998 | Kamiya | 342/383 |

OTHER PUBLICATIONS

Takashi Sekiguchi, et al., "Beamspace Adaptive Array Antenna for Broadband Signals", Proceedings of International Symposium on Antennas and Propagation, Sep. 26, 1996, pp. 761–764.

*Primary Examiner*—Gregory C. Issing
*Attorney, Agent, or Firm*—Oblon, Spivak, McClelland, Maier & Neustadt, P.C.

[57] ABSTRACT

According to the present invention, there is provided an adaptive array antenna including a plurality of antenna elements for receiving radio waves transmitted via multi-carrier waves, weighting means for weighting received signals received by the plurality of antenna elements with weight amounts for the respective antenna elements, adding means for adding up weighted signals by the weighting means, extracting means for extracting particular carrier components from the received signals received by the plurality of antenna elements, and weight setting means for setting the weight amounts for the respective antenna elements to the weighting means on the basis of the particular carrier components extracted by the extracting means.

17 Claims, 13 Drawing Sheets

DESIRED WAVE
JAMMING WAVE   JAMMING WAVE
ANTENNA

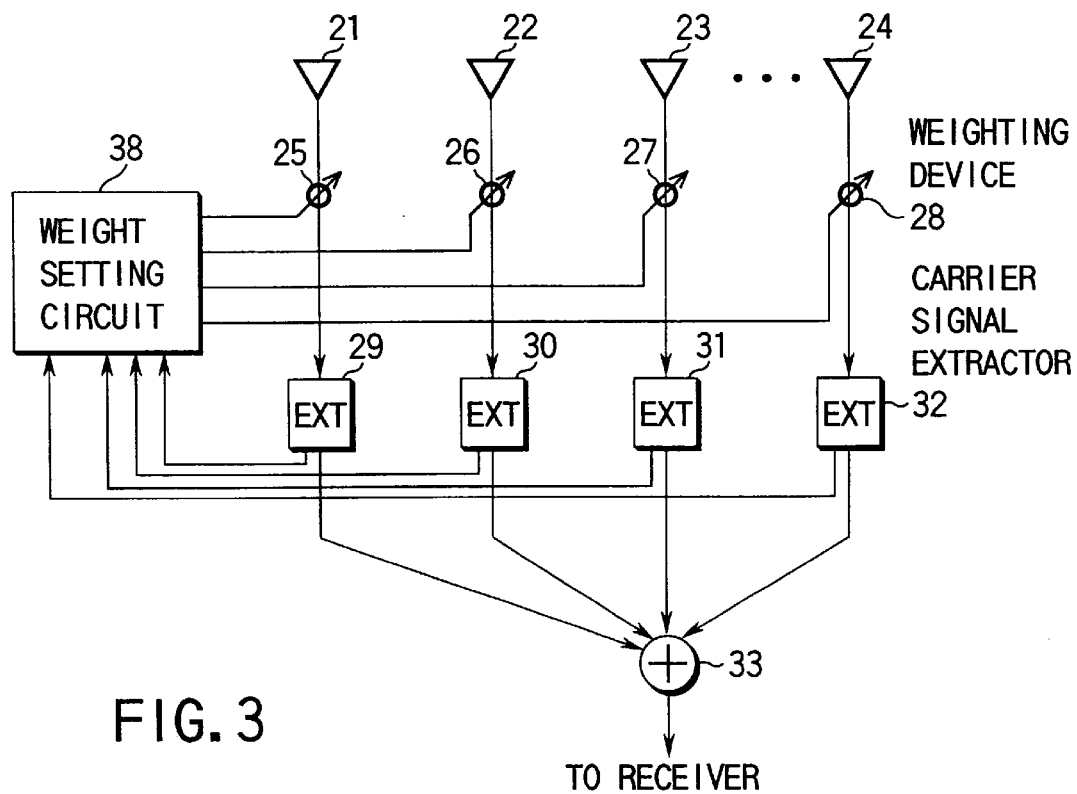
FIG. 3
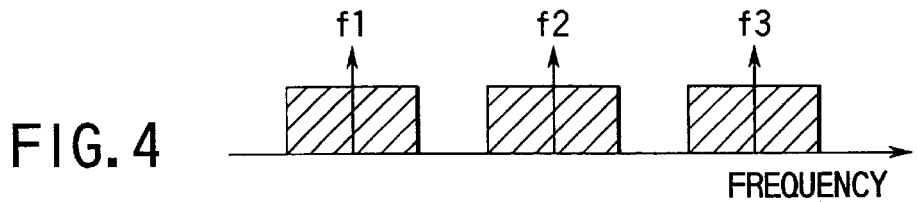
FIG. 4
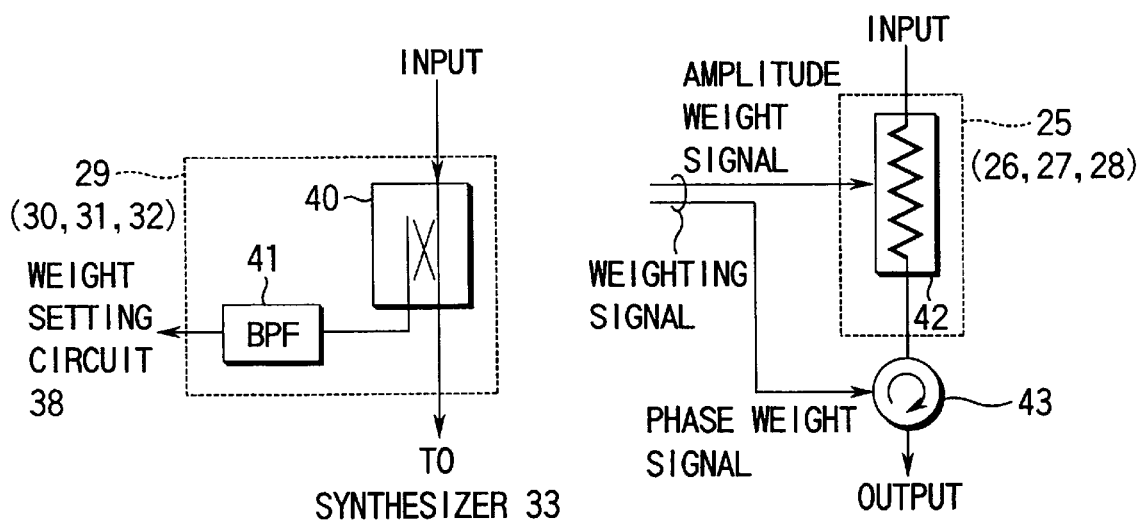
FIG. 5
FIG. 6

ADAPTIVE ARRAY ANTENNA USED IN MULTI-CARRIER WAVE RADIO COMMUNICATIONS

BACKGROUND OF THE INVENTION

The present invention relates to a radio communication system used for mobile communications or the like, and more specifically to an adaptive array antenna appropriately used for multi-carrier radio communications in which wide band signals are transmitted via a plurality of carrier waves.

Conventionally, the adaptive array antenna is known as an antenna for receiving radio waves while suppressing jamming signals such as interference waves in mobile tool communications or the like. The antenna of this type, as shown in FIG. 1, for example, direct its beam to the direction of a desired wave, and automatically forms such a pattern of null (point zero) in the direction of a jamming wave, from a received signal.

An adaptive array antenna basically consists of a plurality of antenna elements. Signals received by these antenna elements are subjected to an appropriate weighting, and the weighted signals are synthesized to form a synthesized pattern as can be seen in FIG. 1. As examples of the method of determining the amount of weighting, the LMS (least means square) method in which the weighting is determined such as to minimize the root error component of an actually received signal with reference to a known reference signal, the MSN (maximum signal to noise ratio) method in which the SN ratio is maximized with a known direction of a desired wave, the PI (power inversion) method in which a strong jamming wave signal is suppressed by the minimization of received power in, for example, reception of a frequency diffusion modulation signal, and the CMA (constant modulus algorithm) method in which an interference wave is suppressed by utilizing the constant envelope property of an amplitude component of a frequency-modulated or a phase-modulated signal, are proposed.

As an example of the prior art technique, the structure of an LMS-type adaptive array antenna is illustrated in FIG. 2. As shown in this figure, an weighting device 12 is connected to each of a plurality of antenna elements 11, and signals received by these antenna elements respectively are individually weighted. These weighted signals are added up by an adder 13, and then outputted. The output obtained by the addition (ADD output) is supplied to a receiver, and at the same time, to a reference signal generating circuit 14, where a reference signal having a strong correlation with a desired signal, and having a weak correlation with a jamming wave, is generated out of the ADD output.

In the case where the reference signal is known, the step of extracting the reference signal from the ADD output, can be omitted. Subsequently, the difference between the ADD signal and the reference signal is output by a subtracter 15 as an error signal, and then input to a control circuit 16. The control circuit 16 determines the weight for each and individual antenna element on the basis of the error signal, and controls each weighting device 12.

Thus, a feedback operation is carried out by establishing the above structure, and consequently, an synthesized antenna pattern obtained with the weighting assigned to each antenna, forms a null in the direction of the jamming wave. As a result, the antenna pattern has a high gain in the direction of the desired wave.

Incidentally, the multi-media is presently brought into focus in general, and similarly, in the field of radio communications, the multi-media communications are brought into focus. In the hear future, a greater capacity of data not only of audio, but also of image or even other data, will be transmitted via radio. Therefore, the reference band width of a wave per one piece of data (channel) is considered to be widened in the future. In order to transmit a wide-band signal, it is essential to enhance the wide-band characteristics of a hardware device such as a receiver; however such a requirement is not easy to achieve.

Under these circumstances, as a solution to the above problem, a multi-carrier transmission mode for transmitting a piece of data by dividing it into several bands and putting them on carriers having different frequencies, has been proposed.

However, regarding the communication system of the multi-carrier transmission mode as described above, in order to constitute an adaptive array antenna for receiving a desired wave efficiently by suppressing an interference wave, it is necessary to provide weighting devices in the same number as that of carrier frequencies, for the antenna elements, as well as circuits for controlling the antenna elements in the same number. As a result, the structure of the antenna becomes very large and complicated.

The object of the present invention is to provide an adaptive array antenna and a multi-carrier radio communication system, which has a simple structure and is capable of being controlled easily in a short period of time and of effectively suppressing unnecessary waves.

BRIEF SUMMARY OF THE INVENTION

The present invention has been proposed as a solution to the above problem, and provides an adaptive array antenna for receiving radio signals transmitted via multi-carrier waves, including a plurality of antenna elements; weighting means for weighting radio signals received by the respective anna elements with weight amounts for the respective antenna elements; adding means for adding up weighted signals by the weighting means; extracting means for extracting one or more particular carrier components from the radio signals received by the plurality of antenna elements; and weight setting means, which receives signals extracted by the extracting means and setting the weight amounts for the respective antenna elements, for outputting the weight amounts to the weighting means.

With the above-described structure, only particular carrier components are extracted from the received signals, and the weighting is set to the respective antenna element on the basis of the signals. Therefore, the adaptive array process for optimizing the antenna directivity to suppressing an interference wave and the like, can be carried out by utilizing the received signals of only some of the carriers. Consequently, the structure and the procedure of the controlling process can be simplified and facilitated, and therefore the present invention is remarkably effective when it is applied to mobile communications and the like, requiring a high transmission speed.

Further, the present invention provides an antenna characterized in that the weight setting means includes: estimating means for estimating a transmission environment for the particular components on the basis of the signals output from the extracting means; and another estimating means for estimating transmission environments for respective carrier components other than the particular carrier components on the basis of the transmission environment for the particular carrier components obtained by the above estimating means, and whereby to set the weight amount for each respective antenna element on the basis of the transmission environments estimated from the carrier components.

With this structure, the transmission environments for the other carrier components are estimated from the transmission environment estimated from the particular carrier components of the received signals, and thus the weight is assigned to each respective antenna element.

Furthermore, the present invention provides an antenna characterized in that the estimating means includes: means for estimating the transmission environment for the particular carrier components, on the basis the signals output from the extracting means, means for determining the weight amount for the respective one of the antenna elements on the basis of the transmission environment estimated from the particular carrier components, and means for determining the weight amounts for the other carrier components than the particular ones, for the respective antenna elements on the basis of the weight amount determined for the particular carrier elements, and with these means, the weight amount for each respective antenna element can be determined from the particular carrier components of the received signals, thus making it possible to set a weight to each respective antenna element by estimating the weight amounts for the other carrier components on the basis of the particular ones.

Furthermore, the present invention provides a multi-carrier radio communication system for transmitting data by assigning it to a plurality of carrier waves, which is characterized in that a pilot signal data (known data) which can be used for the control process of the adaptive array antenna for controlling the antenna characteristics with received radio signals transmitted via multi-carrier waves, is assigned to an exclusive carrier different from the other carriers. With this structure, it becomes possible to perform an adaptive array antenna control using an exclusive carrier, and the structure for the control can be simplified. The pilot signal data can be utilized as received signal data to be compared with a known reference signal, in the case where, for example, the antenna directivity is controlled by the LMS mode.

With the method of transmitting pilot signal data via an exclusive carrier, it becomes possible to facilitate not only the adaptive array process, but also various control processes on the receiving side.

Furthermore, it is preferable that a different modulation mode should be used for the exclusive carrier from that of the plurality of carriers, and thus the modulation mode for the exclusive carrier containing the pilot signal data should be more simplified than the modulation mode for the plurality of carriers.

Furthermore, it is preferable that a different transmission speed should be used for the exclusive carrier from that of the plurality of carriers, that is, the transmission speed for the exclusive carrier containing the pilot signal data should be decreased, and thus the weight setting control can be facilitated.

Furthermore, the present invention provides a multi-carrier radio communication system for transmitting a signal by assigning the data to a plurality of carrier waves, by a coding multiplex operation in a spectrum diffusion communication mode, characterized in that a pilot signal data which can be used for the control process of the adaptive array antenna for controlling the antenna characteristics with received radio signals transmitted via multi-carrier waves, is assigned to only a part of a code of a part of the plurality of carriers. With this structure, it becomes possible to operate the adaptive array antenna by receiving only part of the code-multiplexed carriers, and therefore the receiving device can be simplified.

Furthermore, the present invention provides a multi-carrier radio communication system for transmitting a signal by assigning the data to a plurality of carrier waves, by a time-division multiplex operation, characterized in that a pilot signal data which can be used for the control process of the adaptive array antenna for controlling the antenna characteristics with received radio signals transmitted via multi-carrier waves, is assigned to only a part of a time slot of a part of the plurality of carriers. With this structure, it becomes possible to operate the adaptive array antenna by receiving only part of the time-division multiplexed carriers, and therefore the receiving device can be simplified.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a diagram showing the structure of an adaptive array antenna according to an embodiment of the present invention;

FIG. 4 is a diagram showing an example of the arrangement of carrier signals on a frequency axis in a multi-carrier transmission method used in the embodiment;

FIG. 5 is a diagram showing the structure of a carrier signal extracting device provided in the adaptive array antenna of the embodiment;

FIG. 6 is a diagram showing the structure of a weighting device provided in the adaptive array antenna of the embodiment;

DETAILED DESCRIPTION OF THE INVENTION

Detailed Description of the Preferred Embodiments

Figure 1:
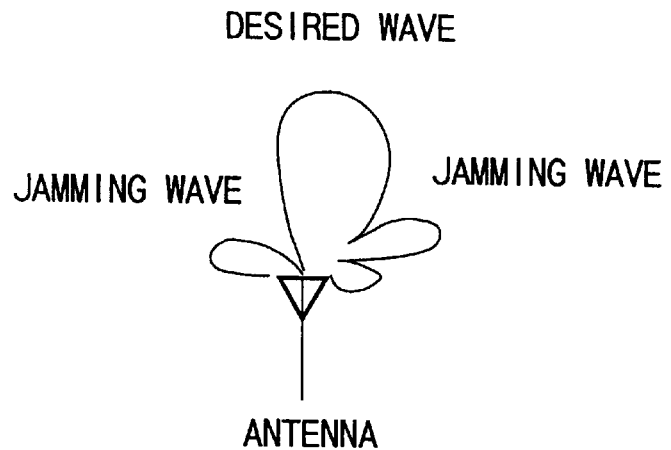
FIG. 1 is a diagram showing an example of the antenna directivity achieved by a conventional adaptive array antenna.
Figure 2:
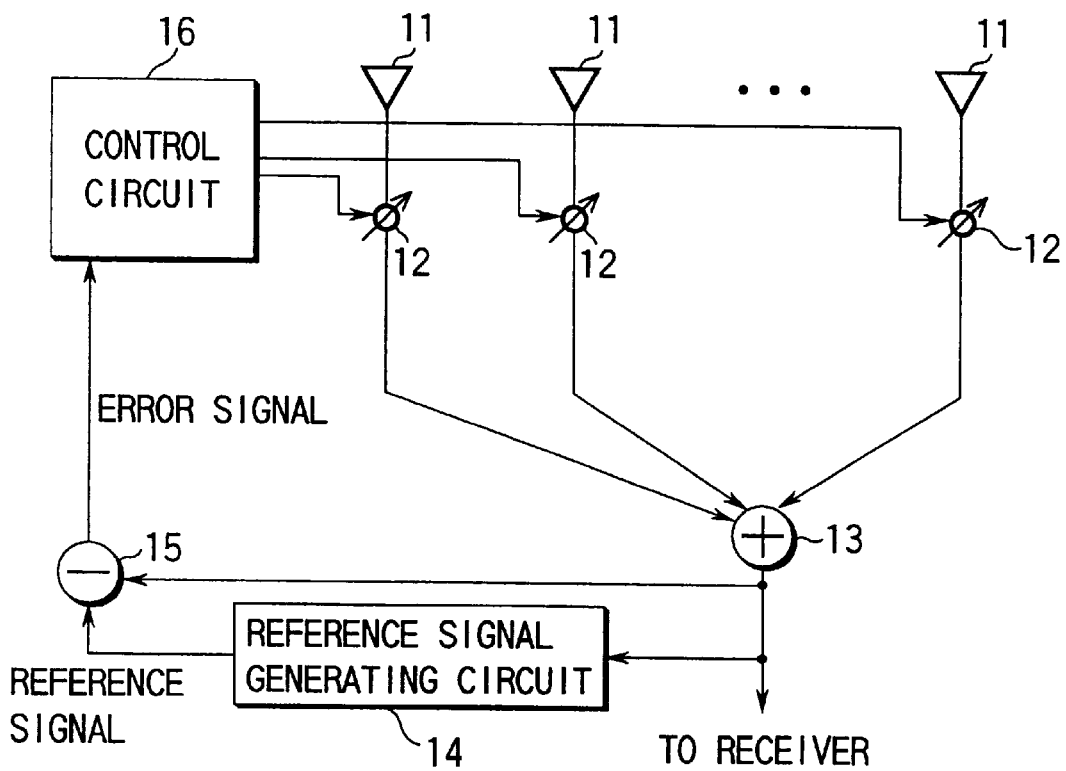
FIG. 2 is a diagram showing the structure of the conventional adaptive array antenna.

Embodiments of the present invention will now be described with reference to accompanying drawings.

FIG. 3 shows an example of the structure of an adaptive array antenna according to the first embodiment of the present invention. Radio wave signals to be received by the antenna are so-called multicarrier antenna, on which one data is divided into three and put on three carrier waves f1, f2 and f3 to be transmitted, as can be seen in, for example, FIG. 4. Multi-carrier signals received by antenna elements 21, 22, 23 and 24 are weighted with complex weights (amplitude weight, phase weight), respectively by weighting devices 25, 26, 27 and 28. Carrier wave signal extractors (EXT) 29, 30, 31 and 32 are connected respectively to the weighting devices 25, 26, 27 and 28. The carrier signal extractors (EXT) 29, 30, 31 and 32 output all the carrier signals which are weighted by the respective antenna elements, to a combiner 33. Further, these extractors extract particular carrier signals (for example, those obtained with a carrier frequency f2), and output them to a weight setting circuit 38.

FIG. 5 shows a specific example of the arrangement of the carrier signal extractors (EXT) 29, 30, 31 and 32. With this arrangement, an input signal is divided by a divider 40. Thus divided component is supplied to the combiner 33, and the other is input to a band pass filter (BPF) 41 which allows only the frequency band of a particular carrier signal to pass. In this filter, only a particular carrier signal is extracted, and the extracted signal is output to the weight setting circuit 38. The weight setting circuit 38 outputs weighted signals each indicating the amount of weight set to a respective antenna element on the basis of the signal data of a particular carrier, and these weighted signals are input to the weighting devices 25, 26, 27 and 28.

As can be seen in FIG. 6, the weighting device 25 includes a variable attenuator (variable gain amplifier) 42 for changing the amplitude level of a signal received by an antenna element, and a variable phase shifter 43 for changing the amount of phase.

In a weighted signal, an amplitude weight signal component is input to the variable attenuator 42, and a phase weight signal component to the variable phase shifter 43.

Figure 7:
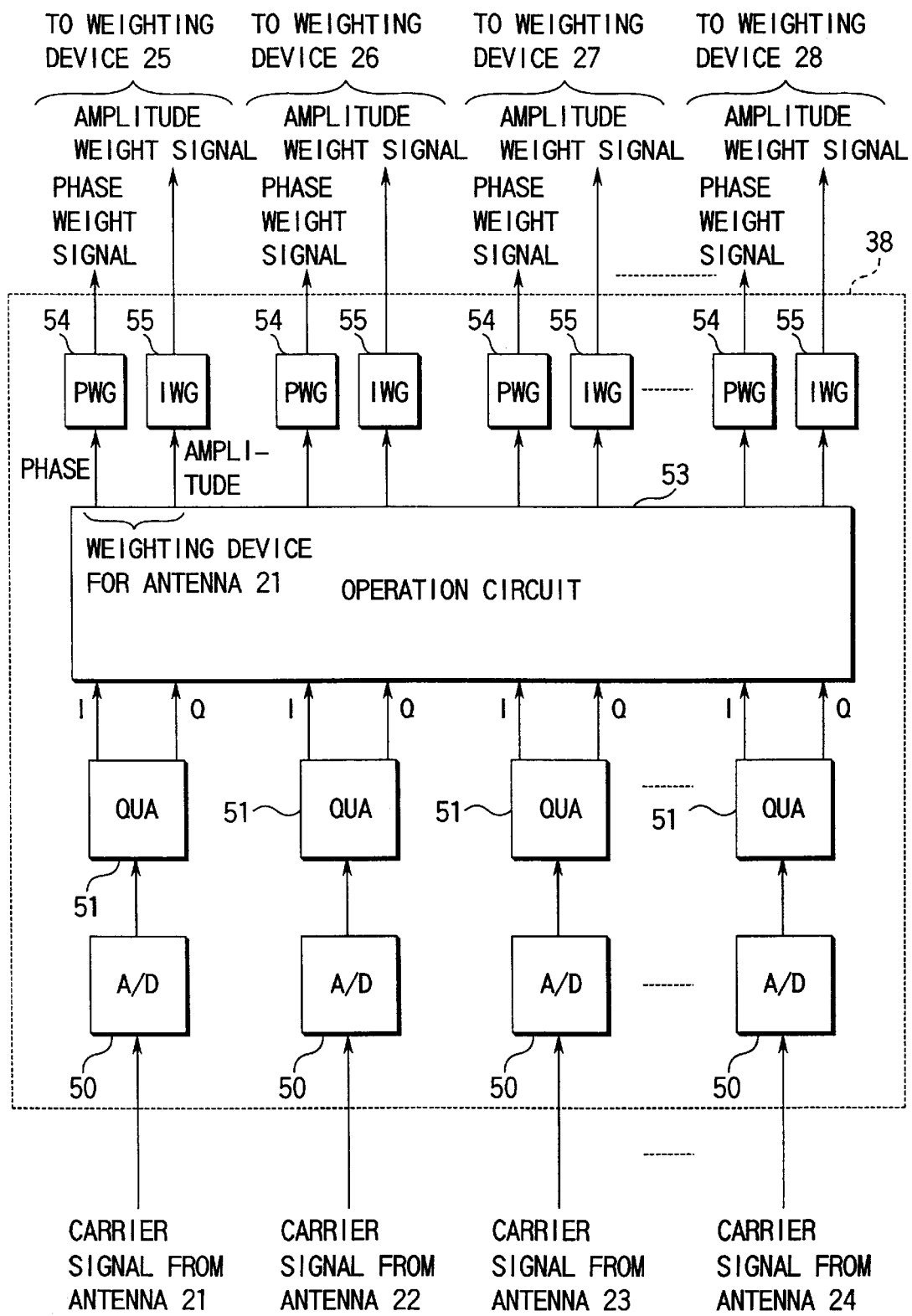
FIG. 7 is a diagram showing the structure of a weight setting circuit provided in the adaptive array antenna of the embodiment.

FIG. 7 shows an example of the structure of the weight setting circuit 38. As can be seen in this figure, particular carrier signals extracted from signals received via the antenna elements 21, 22, 23 and 24 are input to an AD converter (A/D) 50, where an analog signal is converted into digital signals. Subsequently, each digital signal is separated into components vertical to each other (that is, I signal and Q signal) by a quadrature converter (QUA) 51, and then input to an arithmetic operation circuit 53. The operation circuit 53 carries out an adaptive signal processing, for example, directing the beam towards a desired wave or forming a null in the direction of a jamming wave, and outputs weighted signals used for controlling the weighting devices 25, 26, 27 and 28 connected to the antenna elements 21, 22, 23 and 24, respectively.

A weighted signal output from the operation circuit 53 contains an amplitude weight component and a phase weight component, which are independent from each other, and an amplitude weight signal and a phase weight signal are output from an amplitude weight signal generator (IWG) 55 and a phase weight signal generator (PWG) 54, respectively.

The amplitude weight signal generator (IWG) 55 and the phase weight signal generator (PWG) 54 generate respectively an amplitude weight signal and a phase weight signal used for controlling the variable attenuator 42 and the variable phase shifter 43, for example, from an amplitude weight and a phase weight, which are digital signals. It should be noted these weight signals may be, for example, analog bias signals or digital control signals.

The adaptive signal process carried out by the operation circuit 53, can employ an adaptive algorithm such as an LSM (least mean square) algorithm or CMA (constant modulus algorithm).

The LSM algorithm handles a received signal with a loop feedback operation so as to render the signal close to a signal component extracted from the received signal or a reference signal of known signals, by a least mean square approach.

The CMA operates a feedback loop under an instruction principle by which the amplitude of a received signal is made constant as an FSK modulated signal.

Apart from the above, various adaptation methods for suppressing interference waves, including an RLS (recursive least square) algorithm, have been proposed.

The signal processing circuit for carrying out the adaption process may be an analog circuit, or a digital signal processing circuit such as the operation circuit illustrated in FIG. 7. The present invention is applicable to any type of adaptive algorithm or circuit structure.

The feature of this embodiment is that, in the case where the adaptive signal processing for the purpose of suppressing an interference wave, is performed by the multi-carrier transmission mode, the amount of weighting on an antenna amount, obtained on the basis of a received signal in a particular carrier wave, is used also for setting the amount of weighting on another carrier signal.

A procedure of the signal processing operation will now be described in specific.

Figure 8:
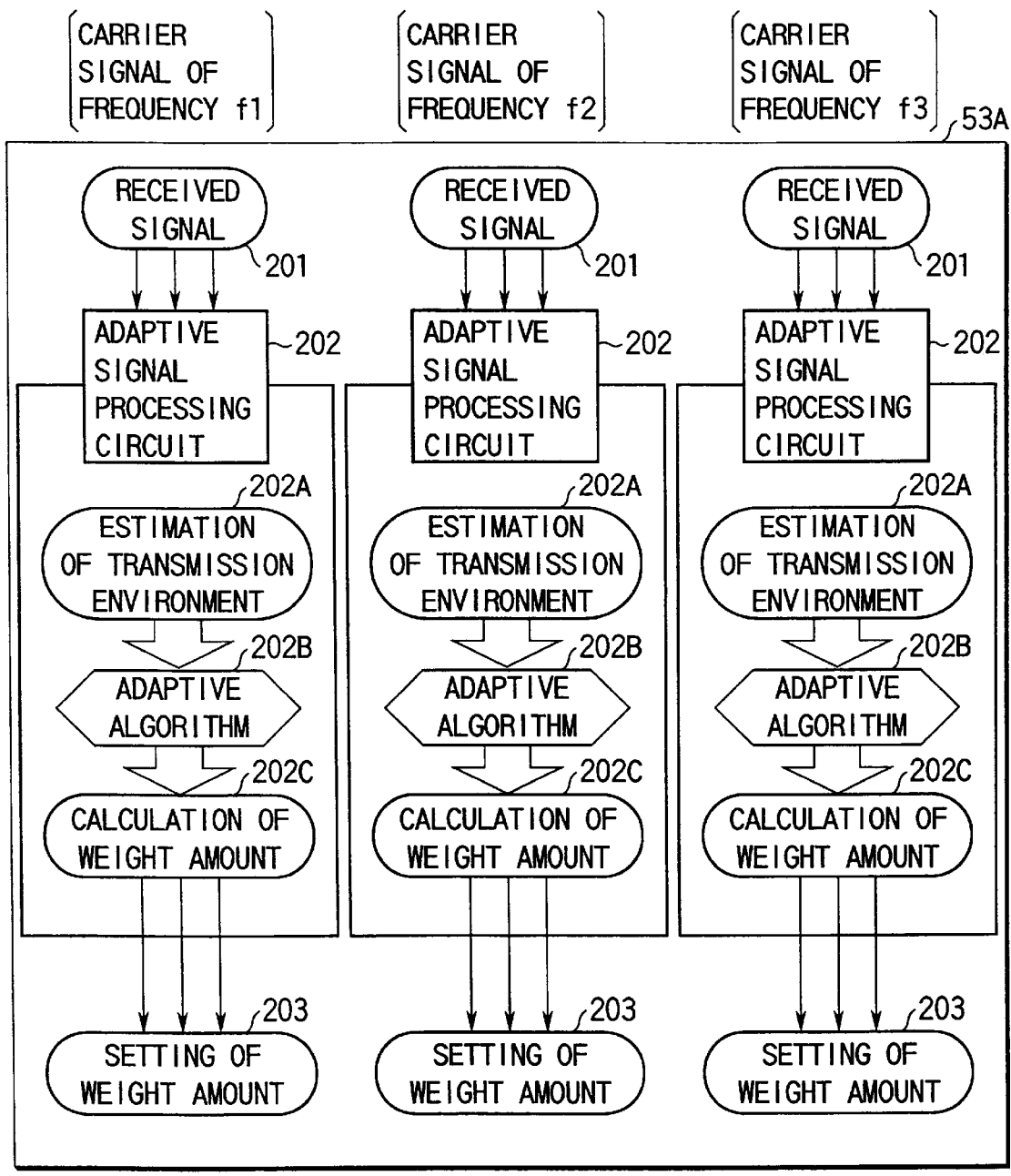
FIG. 8 is a diagram showing an ordinary signal processing procedure in the case of an- adaptive array antenna.

FIG. 8 illustrates a typical signal processing procedure conventionally used. The adaptive signal processing unit 53A of the operation circuit carries out the respective adaptive signal processes for the carrier waves (f1, f2, f3). More specifically, a received signal is extracted from each and individual carrier wave, and the extracted signal is supplied to the adaptive signal processing circuit 202 provided for each carrier wave (Step 201). In each adaptive signal processing circuit 202, the radio transmission environment is estimated by grasping, for example, the directions of a desired wave and a jamming wave, the transmission power and the delay time (Step 202A). Under this estimation, an adaptive algorithm such as the LMS or CMA is applied (Step 202B) so as to calculate the amount of weighting (simply weight) set for each antenna element (Step 202C). By using the results of the calculation, the optimal weighting amount is set for each weighting device (Step 203).

With the procedure described above, an optimal adaptive directivity can be formed from the weighting amount optimally set for each antenna element, and therefore the suppression of an interference wave can be achieved effectively for all the carrier wave signals.

However, in the above procedure, the structure which handles the extraction of a received signal, the adaptive signal process and the weight setting, must be prepared for each and individual carrier wave. As a result, not only the overall structure becomes large and complicated, but also, a great amount of time is required for a signal processing operation.

Figure 9:
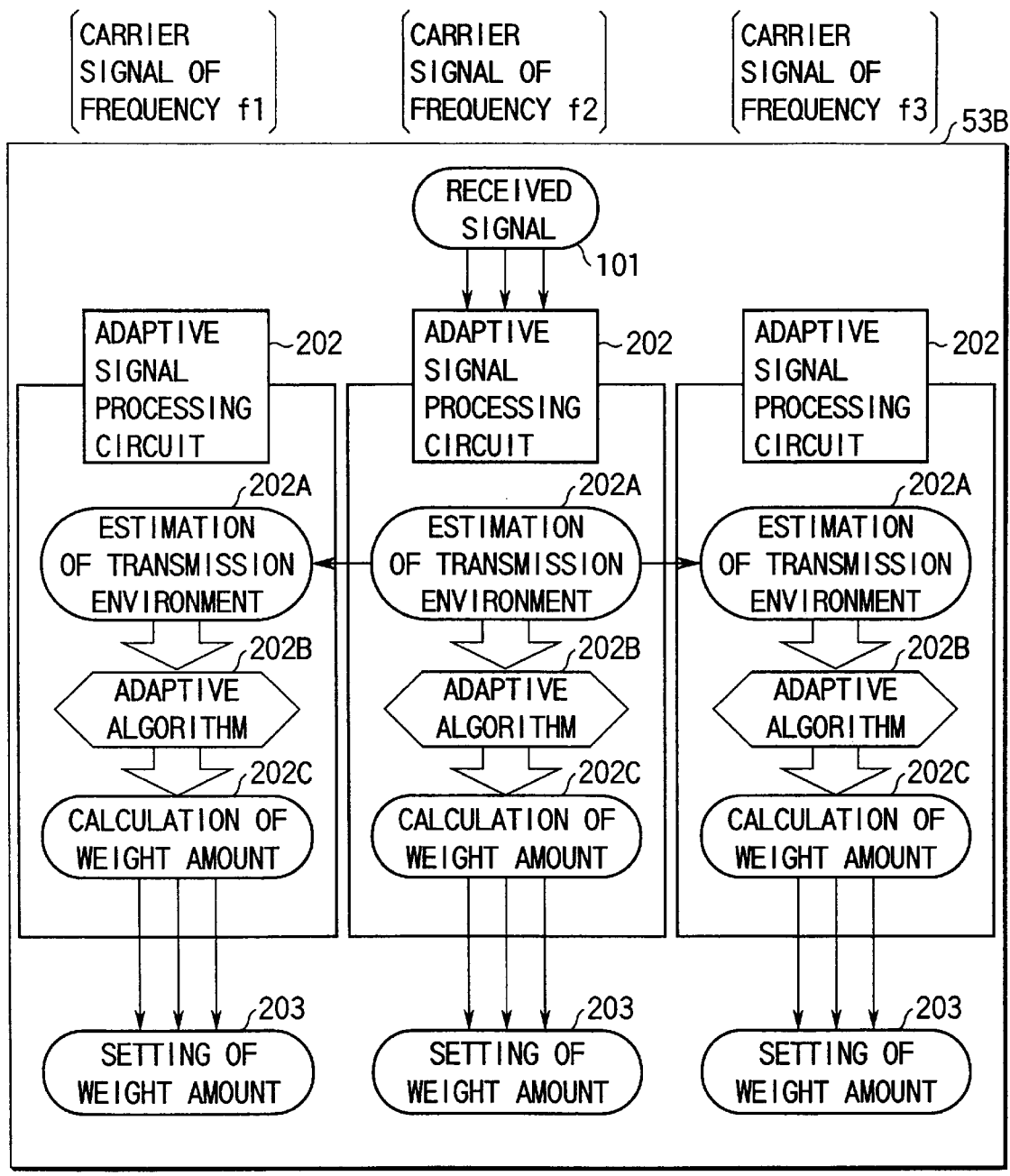
FIG. 9 is a diagram showing an example of the signal processing procedure for the adaptive array antenna according to the embodiment.
Figure 10:
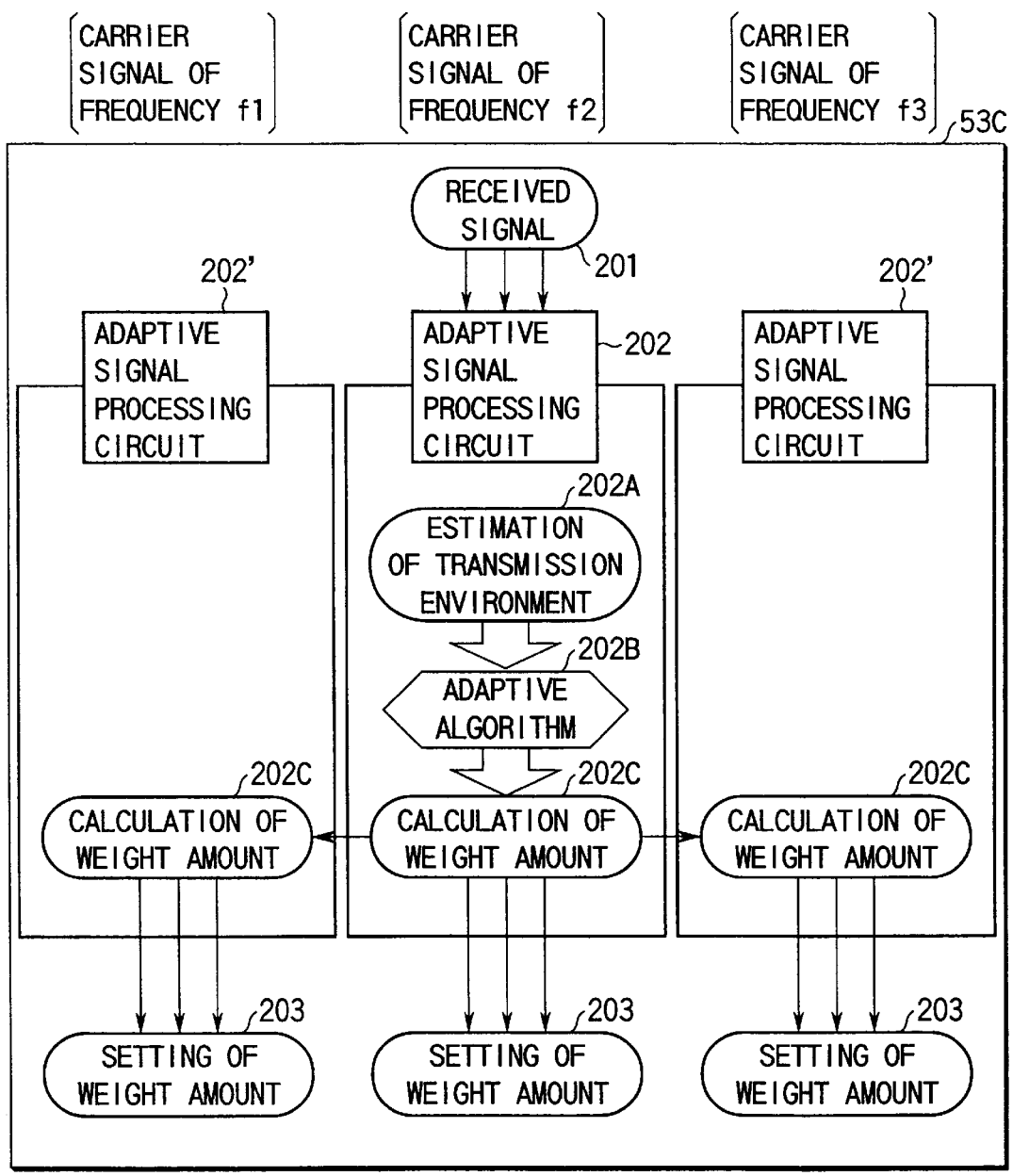
FIG. 10 is a diagram showing another example of the signal processing procedure for the adaptive array antenna according to the embodiment.
Figure 11:
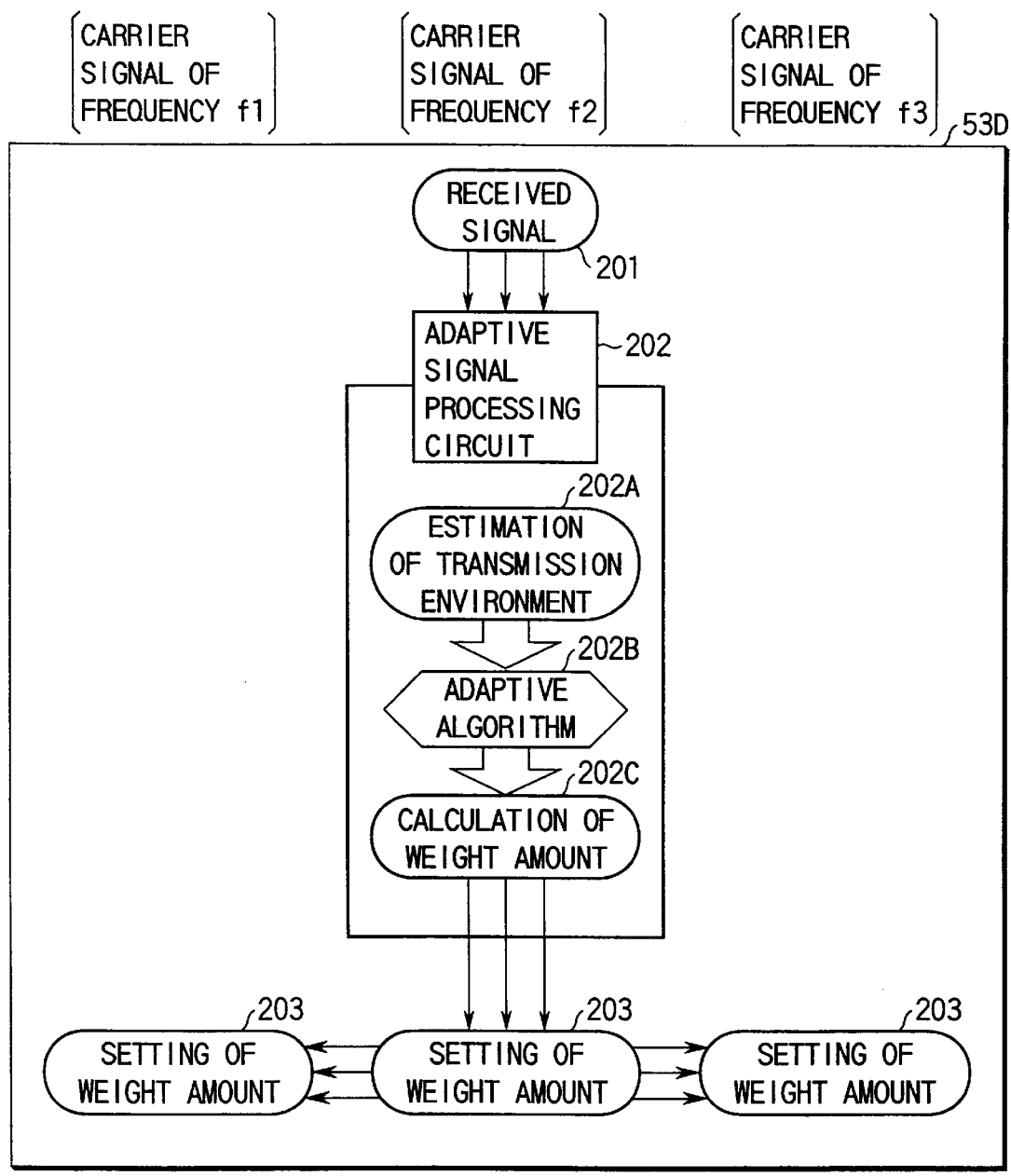
FIG. 11 is a diagram showing still another example of the signal processing procedure for the adaptive array antenna according to the embodiment.

In order to simplify the structure and increase the speed of signal processing, the present invention provides procedures of processing signals, such as shown in FIGS. 9, 10 and 11. An operation common to all the procedures is that the amount of weight, which can be utilized for all carrier signals, is set by using only some of received signals of a plurality of carrier waves. In this case, the extraction of received signals do not have to be carried out on all the carrier waves, but only on some of them. Since only some of the carrier waves are used, the structure of the carrier signal extractor can be significantly simplified.

FIG. 9 shows the first example of the procedure of processing signals, according to the present invention. In this procedure, only one extracted received signal (signal corresponding to a carrier wave of frequency f2) is input to a signal processing circuit 202, and a transmission environment for the carrier wave of frequency f2 is estimated (Step 202A). The transmission environment includes, for example, a desired wave (direct wave and reflected incoming wave), the incoming direction of a jamming wave, the power of a received signal and the delay time. Of these environmental components, an incoming wave can be estimated by using a signal processing algorithm such as MUSIC (multiple signal classification) or ESPRIT (estimation of signal parameters via rotational invariance technique) (Step 202B).

The transmission environments of the other carrier components are estimated on the basis of the difference in frequency and the like, and the results are input as the transmission environment estimation results of the adaptive signal processing circuits 202 for the respective carriers.

The following are two specific examples of the estimation method.

(The first example of the estimation method)

The transmission environment estimated from a received signal of a carrier f2, is input directly as the transmission environments for carriers f1 and f3.

(The second example of the estimation method)

The transmission environments for carriers f1 and f3 are calculated from the transmission environment estimated from a received signal of a carrier f2, in consideration of the difference in frequency and the like, and the calculated results are input to the adaptive signal processing circuit 202.

The method of the first example is effective for the case where the variance in transmission environment due to carrier wave frequency is small, and since there is no need to carry out calculations and the like, the processing time can be effectively shortened.

The method of the second example is effective for an environment where there are multi-pass waves, since the difference in delay time and the like between incoming waves, is estimated from the difference in frequency.

Here, on the basis of the data for the transmission environment obtained for each carrier wave, the amount of weight optimal for each respective case can be calculated by an appropriate adaptive algorithm. In any case of this procedure, received signals extracted for setting the amount of weight, are only particular ones of the carrier components, and therefore the structure of the carrier signal extractor can be remarkably simplified.

It should be noted that, with some adaptive algorithms, it is possible to optimize the amount of weight from received signals without particularly considering the step of estimating the transmission environment. In this case, therefore, a received signal itself is estimated and the estimated signal is input to the respective adaptive signal processing circuit 202. More specifically, for example, from a received signal component of a carrier wave of frequency f2, which is input to an antenna element, the phase shift due to the incident direction and the difference in frequency is estimated. With the estimation, dummy received signals are made, which are input to the respective adaptive signal processing circuits 202 as the signals for carrier waves f1 and f3.

FIG. 10 shows the second example of the procedure of processing signals, according to the present invention. In this procedure, only one extracted received signal (corresponding to a carrier wave of frequency f2) is input to a signal processing circuit 202 (Step 201), and the transmission environment for the carrier wave of frequency f2 is estimated (Step 202A). Then, the amount of weight optimal for the carrier signal of frequency f2 is calculated by an adaptive algorithm (Step 202B). On the basis of the optimal weight for the carrier signal of frequency f2, thus calculated, the amounts of weight optimal for carrier signals of frequencies f1 and f3 are calculated and set (Steps 202C, 203).

This procedure is significant in the respective that the transmission environment estimated from a received signal of a carrier wave of frequency f2 is used directly as the transmission environments for the carriers of frequencies f1 and f2. This procedure is effective in the case where antenna directivities to be formed take the same pattern regardless of carrier frequency.

As a method of estimating the amount of weight optimal for carrier signals of frequencies f1 and f3, the amounts of weights on carrier frequencies f1 and f3 are calculated from the weight obtained from the received signal of frequency f2, and these weights are set to the respective weighting devices.

According to this procedure, the section of the calculation by the adaptive algorithm, which requires the most processing time, is carried out on only particular carrier waves, and therefore the calculation time can be significantly shortened. Further, such a calculation can be handled sufficiently even by an inexpensive digital signal processing circuit having a low operation capability, and therefore the present invention is effective as an actual product.

FIG. 11 shows the third example of the procedure of processing signals, according to the present invention. In this procedure, only one extracted received signal (corresponding to a carrier signal of frequency f2) is input to an adaptive signal processing circuit 202 (Step 201), and the steps until the setting of the weight amount are conducted at once (Steps 202A, 202B, 202C). The amounts of weights on the carrier signals of frequencies f1 and f3 are set to be identical to that of the carrier of frequency f2. In other words, the weighting device is not provided for all the carrier waves, but all the frequency components are weighted by the weighting device for only one carrier (Step 203). Thus, the structure becomes simple, and the load of the calculation part of the signal processing is reduced to minimum.

Thus, with use of calculation means for optimizing the weights (that is, averaged optimization for a plurality of carrier signals) in consideration of frequency characteristics, in the adaptive algorithm or the calculation of the weight amount, an antenna directivity effective for all the frequencies can be achieved.

Figure 12:
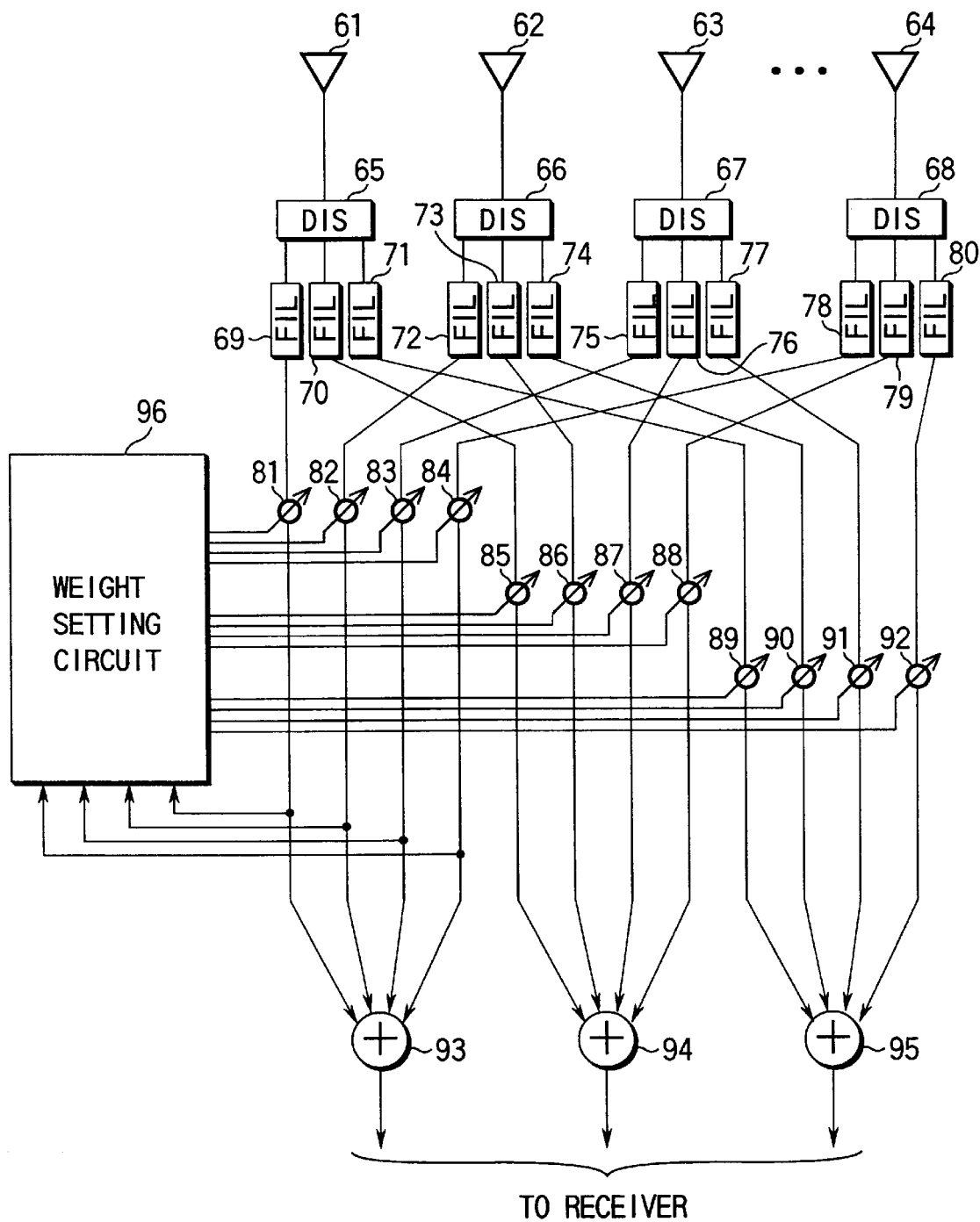
FIG. 12 is a diagram showing the structure of an adaptive array antenna according to the second embodiment of the present invention.

It should be noted that the antenna structure shown in FIG. 3 is an example of the case where the weights are set by the procedure shown in FIG. 11. In the case where the procedure shown in FIG. 9 or 10 is employed, the adaptive array antenna has a structure as shown in FIG. 12. This structure will now be described.

In the following description, as in the case of FIG. 1, an antenna for receiving so-called multi-carrier waves, on which data is divided and assigned to three carrier waves f1, f2 and f3 as shown in FIG. 4 is considered.

Multi-carrier signals received by the antenna elements 61, 62, 63 and 64 are distributed by the divider (DIS) 65, 66, 67 and 68, respectively. Then, in order to extract only the signal component from each carrier wave, band pass filters (FIL) 69, 72, 75 and 78 for extracting a frequency f2 component, band pass filters (FIL) 70, 73, 76 and 79 for extracting a frequency f1 component and band pass filters (FIL) 71, 74, 77 and 80 for extracting a frequency f3 component, are connected respectively. Thus extracted carrier signals are processed as follows. That is, the frequency f2 components are complex-weighted by the weighting devices 81, 82, 83 and 84, and then synthesized by the combiner 93, the frequency f1 components are complex-weighted by the weighting devices 85, 86, 87 and 88, and then synthesized by the combiner 94, and the frequency f3 components are complex-weighted by the weighting devices 89, 90, 91 and 92, and then synthesized by the combiner 95. Subsequently, the received signal components of only frequency f2 are input to the weight setting circuit 96, where the amount of weight to be set to each weighting device is calculated. The other functional devices operate the same as those of FIG. 3.

The above description is a typical case of the first embodiment of the present invention. The same effect can be obtained if the embodiment is modified in the following ways.

(Modified version 1 of the embodiment 1)

The number of carrier waves is not limited to that of the embodiment 1. Further, the number of carrier used for calculating the amount of weight, may be one or in plural. In the case where only one carrier signal is used, the carrier signal should be of the one situated in the center of the frequency band. Thus, the estimation of the weight amount for a carrier signal situated in the periphery of the frequency band, can be effectively carried out. In the case where a plurality of carrier signals are used, those situated at the upper and lower ends of the entire frequency band should be used, and the optimal weight amounts for these carriers should be calculated. Based on the calculation results, the weight amount for a carrier situated in the middle of the frequency band can be estimated (interpolated) by, for example, a linear approximation method.

(Modified version 2 of the embodiment 1)

As a received signal of a frequency of a particular carrier, to be input to the weight setting circuit, a modulated received signal may be directly used, or only the known signal component used for comparison with known data, may be extracted from the received signal, and then the extracted component may be used, or only the pure carrier component may be extracted by eliminating the modulated portion, and the extracted component may be used. With use of the extracted pilot component or carrier component, the structure of the signal processing circuit can be simplified and the processing time can be shortened.

(Modified version 3 of the embodiment 1)

The examples shown in FIGS. 3 and 12 are designed to merely illustrate the basic structure of the present invention, and therefore the amplifiers and the like are omitted from the figures to simplify the explanation. Therefore, it is fine to add devices conventionally used in an array antenna, such as amplifiers and frequency converters, to the embodiment.

(Modified version 4 of the embodiment 1)

The dividers, filters and weighting devices of the examples shown in FIGS. 3 and 12 may be of an analog or digital type. For example, as an extreme example, it is possible that a signal received by an antenna device is directly converted into a digital signal by an A/D converter, and the rest of the structure including the weight setting circuits is realized by digital signal processing circuits. With this structure, the change or revision to the signal processing procedure (software) can be flexibly carried out, and thus a widely applicable adaptive array antenna can be achieved. Examples in which the weight is set by the digital signal process are illustrated in FIGS. 13 and 14.

Figure 13:
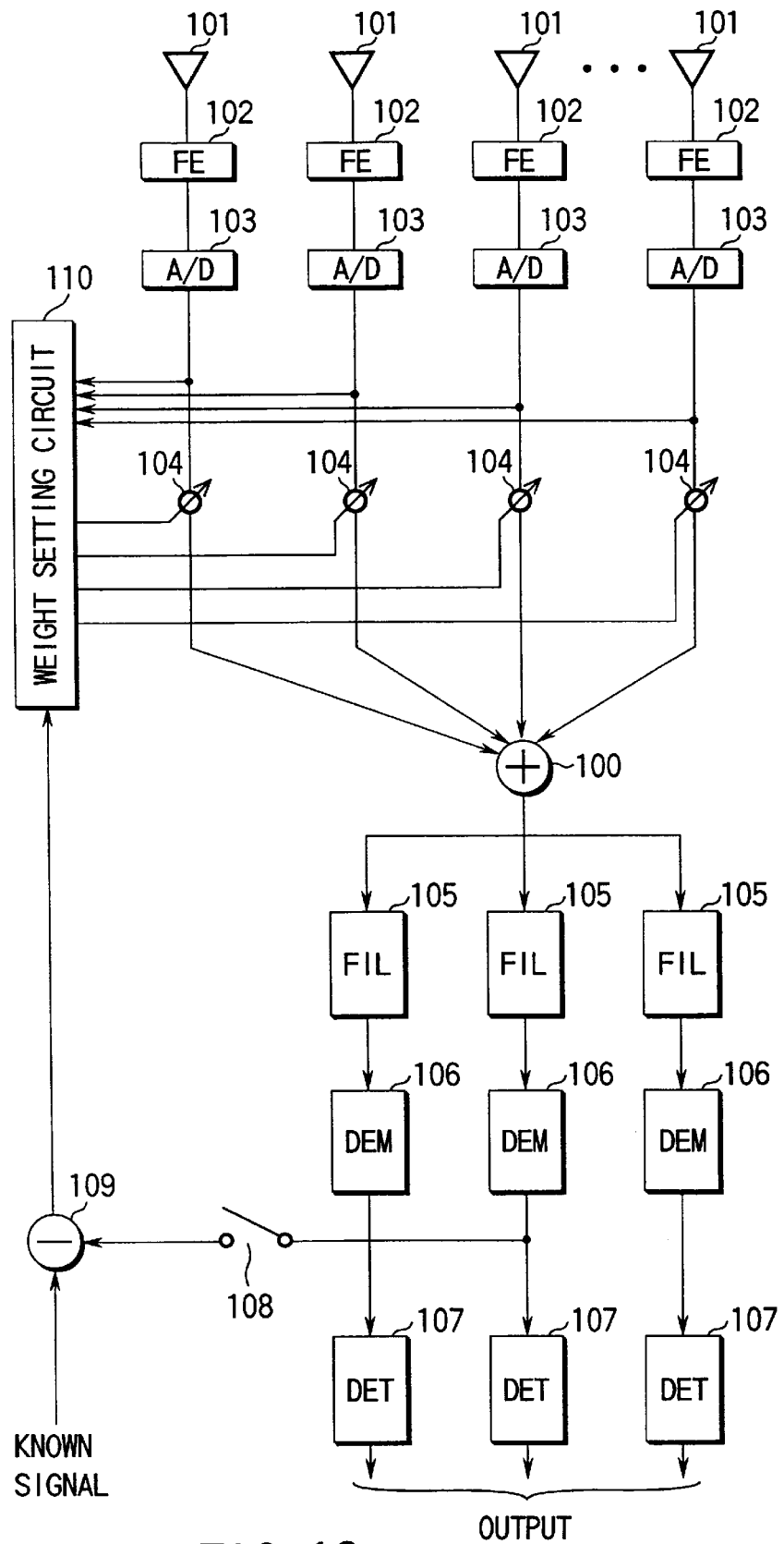
FIG. 13 is a diagram showing the structure of an adaptive array antenna according to the third embodiment of the present invention.

In FIG. 13, signals received by a plurality of antenna elements 101 are all input to an RF front end (FE) 102 including amplifiers and frequency converters, and then they are converted from analog signals to digital signals by the A/D converters (A/D) 103. These signals are input to the weight setting circuit 110, and at the same time, to the weighting devices 104, and the signals are synthesized by an combiner 100. After that, carrier components f1, f2 and f3 are extracted by digital filters (FIL) 105, and each of the carrier components is demodulated by a demodulator (DEM) 106, which is further detected by a detector (DET) 107. Of the carrier components, only a particular one is separated by a switch 108, and then the difference between the particular component and a known (pilot) signal is separated by an attenuator 109, which is input as an error signal to the weight setting circuit 110. The specific procedure and the like for setting the weight are similar to those of the above-described embodiment.

Figure 14:
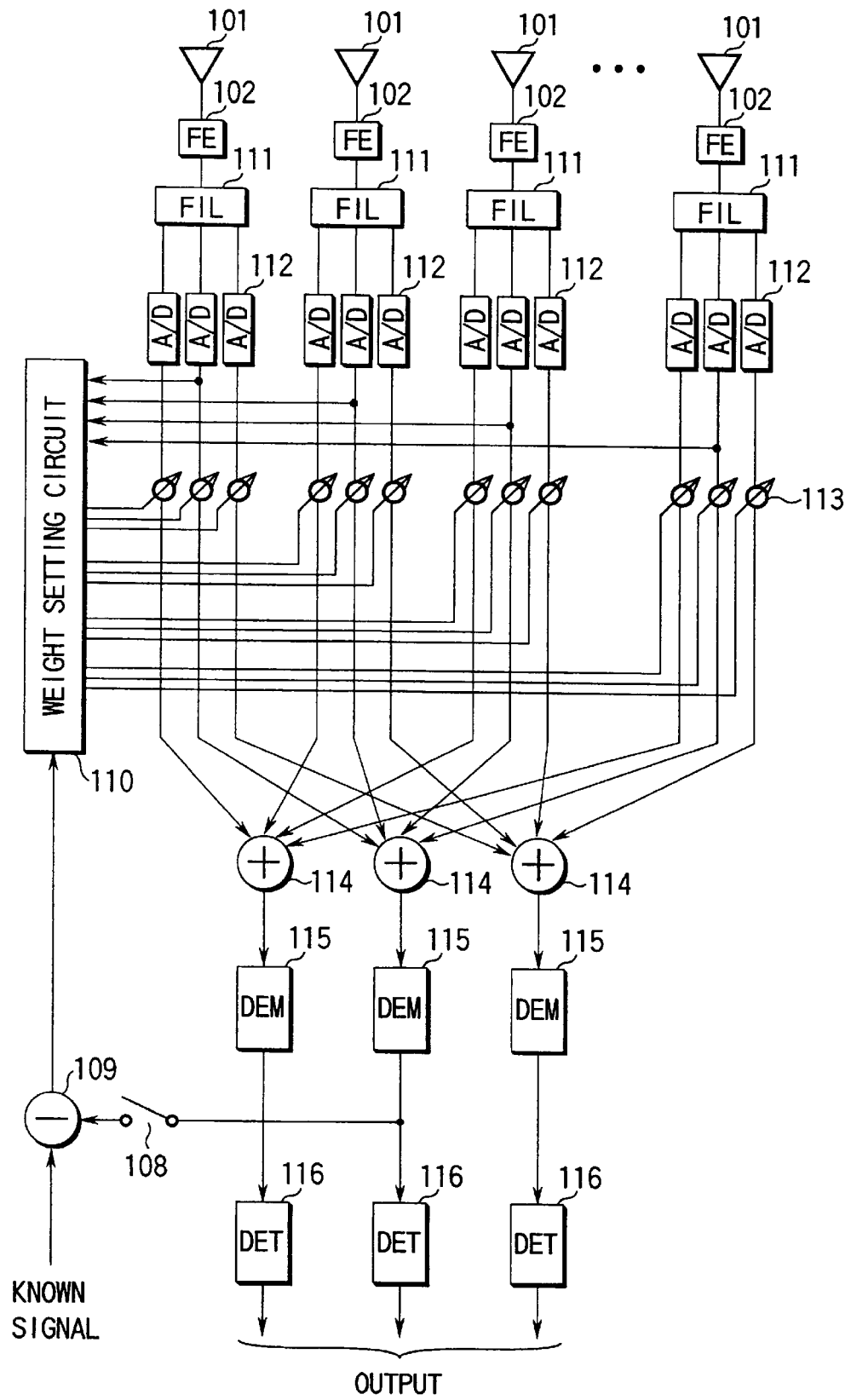
FIG. 14 is a diagram showing the structure of an adaptive array antenna according to the fourth embodiment of the present invention.

In the example shown in FIG. 14, signals received by a plurality of antenna elements 101 are all input to an RF front end (FE) 102, and then carrier signals are extracted from these signals by a sub-carrier discriminating filter (FIL) 111. The signals extracted from the antenna elements and the carrier signals are converted from analog signals to digital signals by the A/D converters (A/D) 103. These signals are input to the weight setting circuit 110, and at the same time, weighted by the weighting devices 113, and the signals are synthesized by an combiner 114 for each carrier component. After that, each of the carrier components is demodulated by a demodulator (DEM) 115, which is further detected by a detector (DET) 116. Of the carrier components, only a particular one is separated by a switch 108, and then the difference between the particular component and a known (pilot) signal is separated by an attenuator 109, which is input as an error signal to the weight setting circuit 110. The specific procedure and the like for setting the weight are similar to those of the above-described embodiment.

Figure 15:
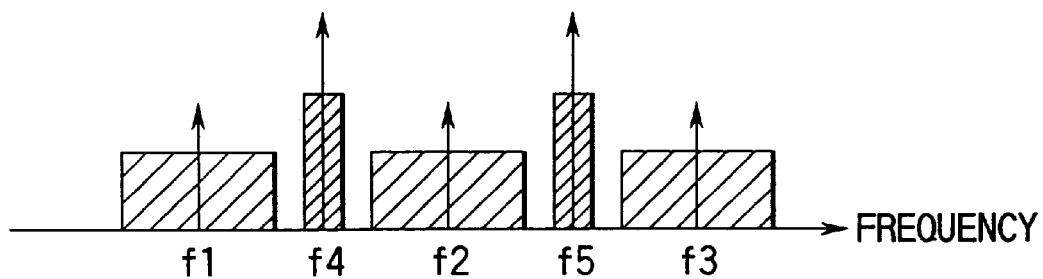
FIG. 15 is a diagram showing an arrangement of carrier signals on the frequency axis in the multi-carrier communication system according to the embodiment.

FIG. 15 shows an example of the frequency assignment of signals used in the multi-carrier radio communication system of the present invention.

On a frequency axis, carrier signals having central frequencies of f1, f2 and f3 and containing data, and carrier signals (pilot signals) having narrow bands and central frequencies f4 and f5, are provided. These pilot signals contains, for example, data to be compared with a reference signal so as to approximate a received signal to the reference signal (such as the known signal of FIG. 13) in the least mean square approach, and thus the pilot signals are utilized in various types of processes for controlling the adaptive antenna array. In other words, with the present invention, a band, a modulation mode, a transmission speed and the like can be selected freely so as to facilitate the adaptive array process, thus the signal processing can be performed at higher speed. Further, in terms of the structure of the adaptive array antenna, the received signal detector (the receiver, for example) exclusively used for pilot signals, can be manufactured easily. Consequently, the adaptive array processing system can be independently and simply manufactured.

The following are specific examples of the detection of received signals.

(Specific example 1 for detecting received signals)

A different modulation mode is used for pilot signals from modulation modes for other carriers. For example, an FSK mode or a BPSK mode, with which the structure of the receiver is simple, should be used as the modulation mode for pilot signals. Thus, the structure for detecting received signals is simplified in the weight setting circuit.

(Specific example 2 for detecting received signals)

The transmission speed for pilot signals is changed to be different from those of other carrier signals. For example, when a lower transmission speed (bit rate) is employed for the carrier signals, the calculation of the weight amount in the weight setting circuit can have a more allowance. This specific example is effective particularly in the case where an algorithm such as LMS, which renews the weight amount one after another, and therefore appropriate for stabilizing the setting of the weight.

As described above, with utilizing an exclusive carrier signal as a pilot signal in the multi-carrier transmission type radio communication system, it is possible to enhance the performances such as the simplification of the structure of the adaptive array antenna and shortening the processing time. Such an enhancement of the performance is very effective when the technique is applied to mobile communications and the like, which require the suppression of an interference wave.

The method of providing a pilot signal is not limited to the example shown in FIG. 15; but the following methods can be considered as alternatives.

(Alternative method 1 for providing a pilot signal)

Figure 16:
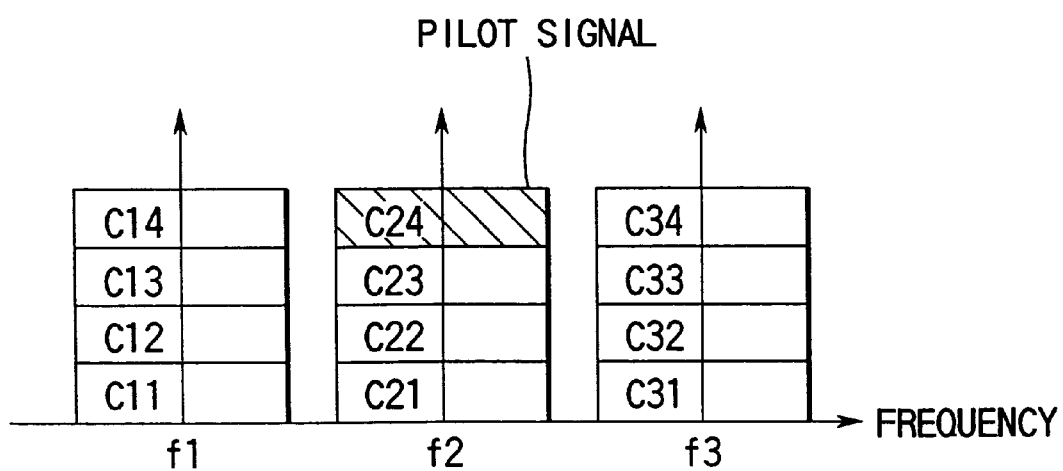
FIG. 16 is a diagram showing an example of the arrangement of carrier signals and pilot signals on the frequency axis in the multi-carrier communication system according to the embodiment.

In the multi-carrier transmission mode of the case where a code-division multiplexing technique is used in the spectrum spread communications, particular code data of a particular carrier signal (carrier of f2, for example) is assigned as a pilot signal (known signal) (that is, for example, a coding signal C24 is assigned as a pilot signal), as can be seen in FIG. 16. With this arrangement, the pilot signal can be utilized for the adaptive array process as in the above-described case, and therefore the most effect mode for the adaptive array process can be realized. Thus, according to this method, as in the case shown in FIG. 15, it is possible to enhance the performances such as the simplification of the structure of the adaptive array antenna and shortening the processing time. Such an enhancement of the performance is very effective when the technique is applied to mobile communications and the like, which require the suppression of an interference wave.

(Alternative method 2 for providing pilot signal)

Figure 17:
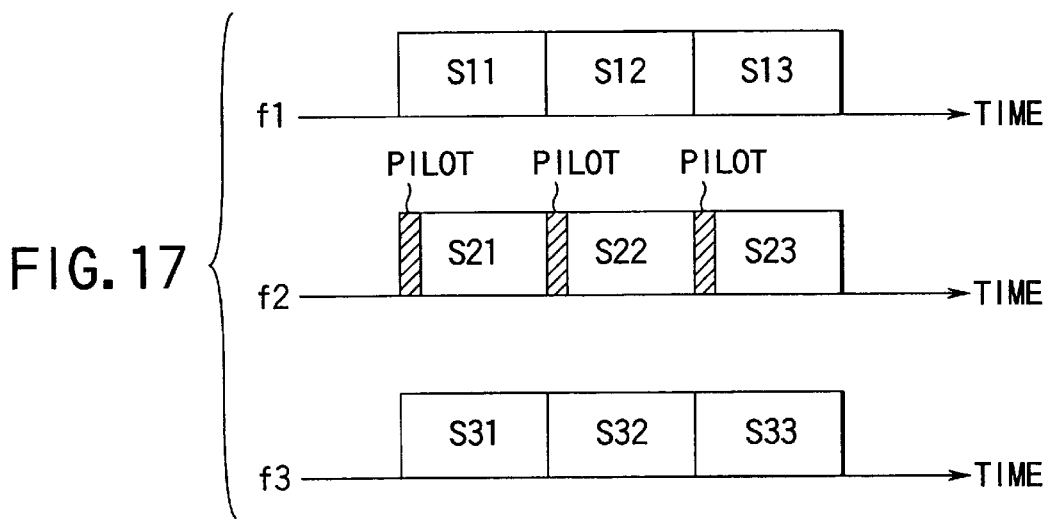
FIG. 17 is a diagram showing a second example of the arrangement of carrier signals and pilot signals on the frequency axis in the multi-carrier communication system according to the embodiment.

Further, the same effect can be obtained by the system in which a time-division multiplex method is employed. FIG. 17 shows an example of such a system in which, a signal assignment (slot) structure in time axis made in one (signal of f2 in this figure) of three carrier signals (f1, f2 and f3). The feature of this method is that the pilot signal (known signal) is provided in a part of the slot of the particular carrier wave.

(Alternative method 3 for providing pilot signals)

Figure 18:
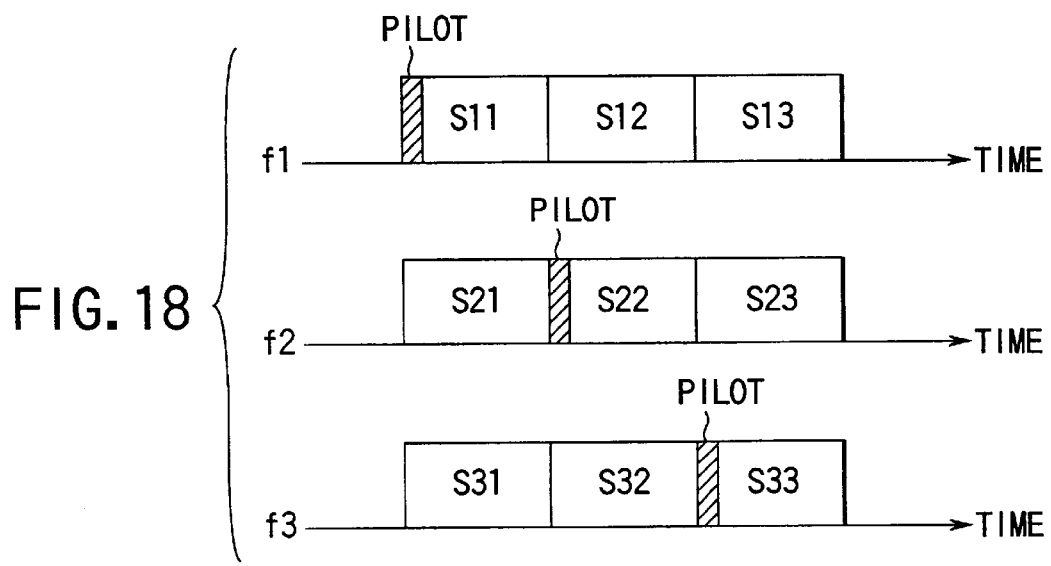
FIG. 18 is a diagram showing a third example of the arrangement of carrier signals and pilot signals on the frequency axis in the multi-carrier communication system according to the embodiment.

Furthermore, the same effect can be obtained in a system in which the time-division multiplex mode is employed, when pilots are provided in all the carrier signals, but at different locations along the time axis, as can be seen in FIG. 18. This method will now be described by taking the example shown in FIG. 18. First, the weight amount is set (calculated) on the basis of the received signal of the pilot (provided in a slot S11) on a frequency f1. In the subsequent time, the weight amount is set or renewed on the basis of the received signal of the pilot (provided in a slot S22) on a frequency f2. In the further subsequent time, the weight amount is set or renewed on the basis of the received signal of the pilot (provided in a slot S33) on a frequency f3. The operation in the weight setting circuit involves the calculation of the weight amount on the basis of only one pilot signal basically at any time, and therefore the signal processing time can be shortened, and a high speed process can be achieved. Apart from this, in the example shown in FIG. 18, the frequency of the received signal serving as the origin of setting the weight amount is changed one after another. Therefore, the estimation of the weight amount due to the difference in frequency is corrected always at a certain time interval, thus it is possible to improve the efficiency of the estimation of the weight amount.

Figure 19:
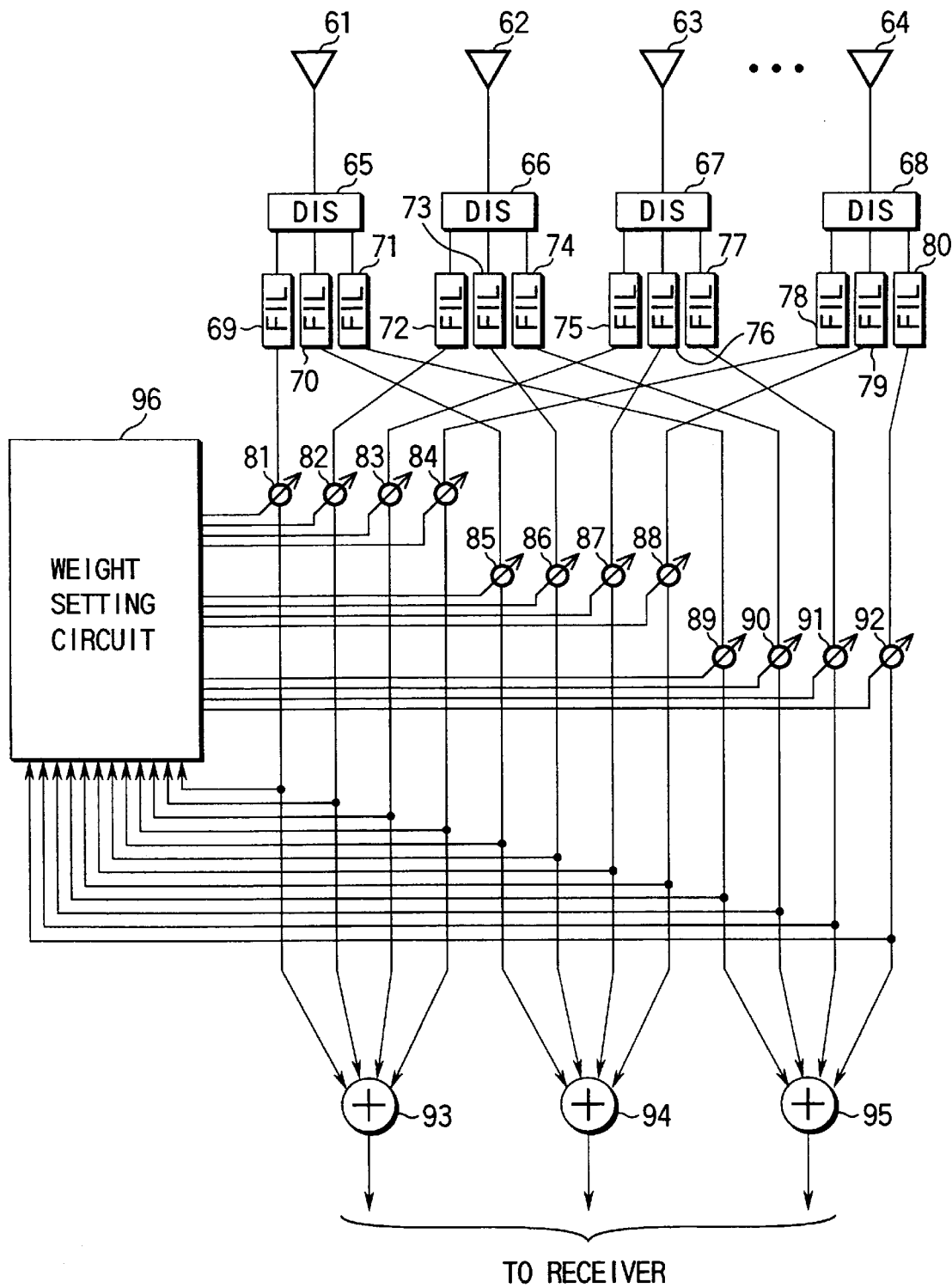
FIG. 19 is a diagram showing an adaptive array antenna according the fifth embodiment of the present invention.

It should be noted that the just-mentioned example can be achieved by the antenna structure shown in FIG. 19. The difference between the structures shown in FIGS. 12 and 19 is that, in FIG. 19, received signals (pilot received signals) to be input to the weight setting circuit 96 are extracted from all the frequency components.

As described, with the adaptive array antenna of the present invention, which employs the multi-carrier transmission mode, it is possible to perform an adaptive array process for optimizing the antenna directivity while suppressing interference waves and the like, by utilizing only the received signals of some of the carriers. Therefore, the antenna structure becomes simple since it has to extract only some of the carrier components. Consequently, the manufacture of the antenna can be facilitated, and the production cost can be reduced. Further, in its signal processing circuit, the processing procedure can be simplified, and the processing time and calculation time can be shortened. Therefore, the present invention is remarkable effective when it is applied to mobile communications and the like, in which the transmission speed is high.

Moreover, in the multi-carrier radio communication system of the present invention, pilot signals can be placed on the most effective locations on the frequency axis, the time axis and the coding axis, for the adaptive array signal processing. Therefore, not only the structure itself of the signal processing circuit can be simplified, but also, the speed of the process itself can be significantly increased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An adaptive array antenna comprising:
   antenna elements which receive radio waves transmitted via a multi-carrier transmission system;
   weighting circuits which weight received signals output from said antenna elements;
   an adder which adds up weighted signals output from said weighting circuits;
   an extractor which extracts only components of a first carrier from said received signals; and
   a weight setting circuit which sets weights for the respective antenna elements outputting received signals to said weighting circuits based upon the components extracted by said extractor.

2. An antenna according to claim 1, wherein said weight setting circuit includes:
   a first estimating circuit which estimates a first transmission environment for the first carrier based upon the components extracted by said extractor;
   a second estimating circuit which estimates a second transmission environment for a second carrier on the basis of the first transmission environment estimated by said first estimating circuit;
   a first calculating circuit which calculates a first weight for the first carrier based upon the first transmission environment estimated by said first estimating circuit; and
   a second calculating circuit which calculates a second weight for the second carrier based upon the second transmission environment estimated by said second estimating circuit.

3. An antenna according to claim 2, wherein said first estimating circuit includes an estimator which estimates the first transmission environment based upon incoming directions of a desired wave and a jamming wave, a receiving power and a receiving delay time for the first carrier.

4. An antenna according to claim 2, wherein said first calculating circuit and said second calculating circuit each include a calculator which calculates the first and second weights by any one of least means square algorithm, a constant modulus algorithm or a recursive least square algorithm.

5. An antenna according to claim 1, wherein said weight setting circuit includes:
   an estimating circuit which estimates a first transmission environment for the first carrier based upon the components extracted by said extractor; and
   a calculating circuit which calculates a first weight for the first carrier and a second weight for a second carrier based upon the first transmission environment estimated by said estimating circuit.

6. An antenna according to claim 5, wherein said calculating circuit includes:
   a first calculator which calculates the first weight based upon the first transmission environment estimated by said estimating circuit; and
   a second calculator which calculates the second weight based upon the first weight calculated by said first calculator.

7. An antenna according to claim 5, wherein said calculating circuit includes:
   a calculator which calculates the first and second weights based upon the first transmission environment.

8. An antenna according to claim 5, wherein said estimating circuit includes an estimator which estimates the first transmission environment based upon incoming directions of a desired wave and a jamming wave, a receiving power and a receiving delay time for the first carrier.

9. An antenna according to claim 5, wherein said calculating circuit includes a calculator which calculates the first and second weights by any one of a least means square algorithm, a constant modulus algorithm or a recursive least square algorithm.

10. A multi-carrier radio communication system comprising:
    a transmission system for transmitting data and pilot signal data carried on carrier waves;
    an adaptive array antenna according to claim 1;
    a receiving unit connected to said adaptive array antenna; and
    controlling means for controlling antenna characteristics of said antenna elements of said adaptive array antenna, on the basis of said pilot signal data obtained via said receiving unit.

11. A system according to claim 10, wherein said transmission system includes means for transmitting a signal while assigning said data on a plurality of carrier waves and said pilot signal data on an exclusive carrier wave different from said plurality of carrier waves.

12. A system according to claim 10, wherein said transmission system includes means for rendering a modulation mode for said plurality of carrier waves different from that of said exclusive carrier.

13. A system according to claim 10, wherein said transmission system includes means for rendering a transmission speed for said plurality of carrier waves different from that of said exclusive carrier.

14. A system according to claim 10, wherein said transmission system includes means for transmitting a signal by assigning said data and said pilot signal data on a plurality of carrier waves, by a coding multiplex operation in a spectrum diffusion communication mode.

15. A system according to claim,10, wherein said transmission system includes means for transmitting a signal by assigning said data and said pilot signal data to a plurality of carrier waves, by a time-division multiplex operation.

16. A system according to claim 10, wherein said transmission system includes means for transmitting a signal by assigning said data to a plurality of carrier waves, by a coding multiplex operation in a spectrum diffusion communication mode, and assigning said pilot signal data to only a code of a part of said plurality of carrier waves.

17. A system according to claim 10, wherein said transmission system includes means for transmitting a signal by assigning said data to a plurality of carrier waves, by a time-division multiplex operation, and assigning said pilot signal data to only a time slot of a part of said plurality of carrier waves.

* * * * *